(12) United States Patent
Arnaiz

(10) Patent No.: US 10,086,822 B2
(45) Date of Patent: Oct. 2, 2018

(54) ENGINE CONTROL SYSTEM

(71) Applicant: Valeo Systemes de Controle Moteur, Cergy Saint Christophe (FR)

(72) Inventor: Lionel Arnaiz, Paris (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 15/523,579

(22) PCT Filed: Nov. 5, 2015

(86) PCT No.: PCT/FR2015/052994
§ 371 (c)(1),
(2) Date: May 1, 2017

(87) PCT Pub. No.: WO2016/071642
PCT Pub. Date: May 12, 2016

(65) Prior Publication Data
US 2017/0313298 A1    Nov. 2, 2017

(30) Foreign Application Priority Data

Nov. 7, 2014   (FR) .................................... 14 60789

(51) Int. Cl.
*B60W 20/11*    (2016.01)
*B60W 20/12*    (2016.01)
*B60W 20/14*    (2016.01)

(52) U.S. Cl.
CPC ............ *B60W 20/11* (2016.01); *B60W 20/12* (2016.01); *B60W 20/14* (2016.01);
(Continued)

(58) Field of Classification Search
CPC combination set(s) only.
See application file for complete search history.

(56) References Cited

U.S. PATENT DOCUMENTS

2002/0188387 A1* 12/2002 Woestman ............. B60K 6/365
   701/22
2015/0073637 A1* 3/2015 Lennevi ............ B60W 50/0097
   701/22
2015/0142287 A1* 5/2015 Dornieden ............ B60W 30/16
   701/70

FOREIGN PATENT DOCUMENTS

DE    10 2012 013689 A1    1/2014
WO    2013/167149 A1    11/2013
WO    2014/058383 A2    4/2014

OTHER PUBLICATIONS

International Search Report issued in PCT/FR2015/052994 dated Jan. 20, 2016 (2 pages).

(Continued)

*Primary Examiner* — Anne M Antonucci
*Assistant Examiner* — Renee LaRose
(74) *Attorney, Agent, or Firm* — Osha Liang LLP

(57) ABSTRACT

The present invention relates to a method for managing the drive system of a hybrid vehicle comprising an internal combustion engine and an electric machine having an energy storage means, wherein the vehicle has information on the topology of an approaching downward section of road. Said method includes: predicting a power need of the vehicle according to at least one slope degree of said section of road; predicting the mode of operation of the drive system as well, said mode of operation being selected from at least: a freewheel descent, a descent assisted by the drive system, preferably by the electric machine only, a descent braked by energy recovery; and adjusting the energy level in the storage system prior to arrival on the section of road according to said predictions.

10 Claims, 1 Drawing Sheet

Figure 1:
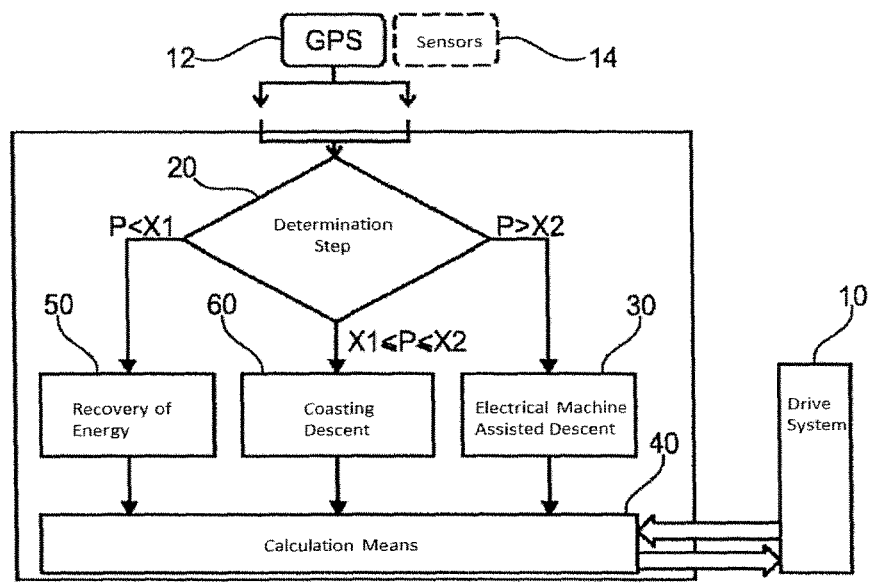

(52) U.S. Cl.
CPC . *B60W 2510/244* (2013.01); *B60W 2550/142* (2013.01); *B60W 2550/143* (2013.01); *B60W 2550/402* (2013.01); *Y10S 903/93* (2013.01)

(56) References Cited

OTHER PUBLICATIONS

Written Opinion of the International Searching Authority issued in PCT/FR2015/052994 dated Jan. 20, 2016 (4 pages).

\* cited by examiner

ENGINE CONTROL SYSTEM

The present invention concerns the management of a drive system of a hybrid vehicle comprising a thermal engine and an electrical machine with energy storage means.

It is known to exploit information linked to the topology of the road over which the vehicle is traveling by seeking optimum exploitation of the relief thereof as a potential source of energy recovery.

Known energy management strategies adapt the level of energy in the storage means to optimize recovery on a slope. However, in these strategies a downgrade road situation is perceived as a potential source of energy only if the slope is relatively steep.

WO 2014/058383 discloses a method in which the expected speed over an upcoming road section is calculated using a geolocation system so as to determine if the upcoming slope will lead to recovery braking.

There exists a requirement to improve further the methods of managing the drive system of a hybrid vehicle in order to reduce further the consumption of fuel.

The invention addresses it by means of a method of managing the drive system of a hybrid vehicle including a thermal engine and an electrical machine with an energy storage means, the vehicle having information on the topology of an upcoming downgrade road section, in which method a power demand of the vehicle is predicted as a function of the slope of said section and the speed limit in said section, in which the operating mode of the drive system is also predicted, said operating mode being chosen at least from:
  coasting descent,
  descent assisted by the drive system, preferably by the electrical machine alone,
  descent braked by recovery of energy,
and in which the level of energy in the storage system is adapted before arrival at the section as a function of said predictions.

Thanks to the invention, the drive system can operate in an optimized manner, including for slope situations in which the slope remains relatively shallow.

The energy storage means is preferably electrochemical.

In one embodiment of the method, the predicted operating mode is descent braked by recovery of energy and the level of energy in the storage means is modified before arriving at the section so that on leaving the section the level of energy in the storage means is higher than on arriving at the section and the level of energy in the storage means on leaving the section preferably reaches its upper limit.

The level of energy in the storage means can also be increased before arrival at said section. For example, the level of energy in the storage means is increased before commencing the descent so that the energy storage means can supply all the energy necessary for maintaining the authorized limit speed for the vehicle throughout the descent, the operating mode then preferably being driving by the electric motor only.

The power demand is preferably also predicted on the basis of the known limit speed authorized for the vehicle on said section.

The aim is preferably for the level of energy in the storage means to evolve between minimum and maximum limits when the vehicle travels over said section.

The information concerning the topology can be received from a geolocation system, notably a GPS system, and/or from other vehicles.

The vehicle can maintain a constant speed when it travels over the upcoming road section and the predictions can be made on that basis.

The invention further consists in a drive system equipped with a calculation means adapted to implement the method according to the invention as defined above.

The invention further consists in a hybrid vehicle equipped with a drive system according to the invention.

Figure 2:
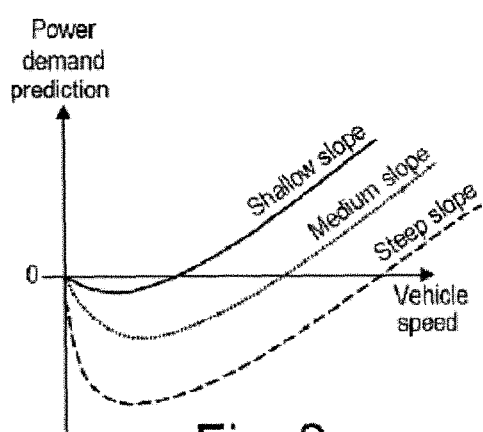
Figure 3:
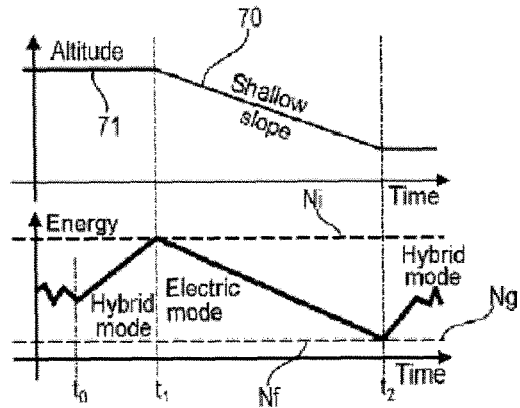
Figure 4:
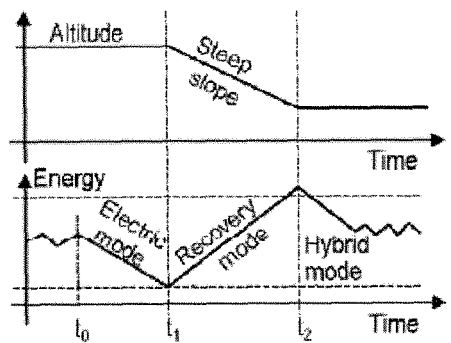

The invention will be better understood after reading the following detailed description of one nonlimiting embodiment thereof and examining the appended drawing, in which:

FIG. 1 is an example of an algorithm that can be used in a method according to the invention of managing the drive system, FIG. 2 represents examples of the evolution of the power demand as a function of the speed of the vehicle and the slope, and FIGS. 3 and 4 illustrate the evolution of the energy in the storage means over time and as a function of the altitude of the vehicle for two examples of road topologies.

The invention applies to a hybrid vehicle including a drive system 10, also known as a powertrain, said drive system including a thermal engine and an electrical machine with energy storage means.

The thermal engine delivers a torque that can be used to drive the wheels of the vehicle via an appropriate transmission. This thermal engine is an internal combustion engine, for example, such as a diesel or petrol engine, or an engine operating with other liquid or gas fuels such as ethanol or hydrogen, for example.

The electric motor can be a motor capable of operating reversibly as an electrical generator.

The storage means can be electrochemical and/or inertial, preferably being electrochemical such as a battery or one or more supercapacitors.

The vehicle includes information means making it possible to have available the topology of the road to come.

Said means include for example a geolocation data receiver 12 such as a GPS receiver. The geolocation data makes it possible to know the position of the vehicle in real time and, by interrogating a map database, the topology of the road to come and notably the presence of slopes and the degree of the slopes. The source of map data can be an onboard source.

The topology data can equally come from other sensors 14, notably in the case of an interactive road network where the vehicles exchange data with one another, notably when passing one another.

The map data source can also supply information as to the possible presence of a speed limit that would cause the driver to slow down.

The vehicle includes calculation means 40 such as an electronic circuit for management of the operation of the drive system 10 which, in a step 20 of the FIG. 1 algorithm, determines from at least topology and authorized speed limit information the power to be supplied to travel the upcoming downgrade road section.

The calculations can be effected on the basis of various hypotheses, notably the hypothesis that the speed of the vehicle is held equal to the authorized speed limit, in particular when the traffic is circulating freely.

It is seen in FIG. 2 that the higher the speed of the vehicle, the greater the power demand is. The power demand is negative over a certain range of speeds the extent of which is wider when the slope is steeper.

If the power demand P allowing for the slope and the speed is above a threshold $x_2$, energy recovery is not possible and the drive system must remain in driving mode, preferably using the electric motor (electric mode) as the source of motive power, if the level of energy in the storage means allows this, or otherwise the thermal engine (hybrid mode).

The calculation means 40 determine the commands to be sent to the drive system 10 as a function of this situation 30. In particular, they are able to impose operation in electric or hybrid mode during the descent.

If the power demand P is below a threshold $x_1$, then the slope can be used to regenerate the energy storage means and the drive system 10 is controlled as a function of said situation 50. The calculation means can impose operation in recovery mode on the drive system.

If the power demand P is between the two, that is to say $x_1 \leq P \leq x_2$, then the drive system 10 is controlled as a function of said situation 60 to disconnect the wheels and to allow the vehicle to coast.

The downgrade section may be divided into a plurality of portions with different slopes in which the operating mode changes.

According to the identified power demand and the operating mode adopted, a target level of energy to be reached is also determined, for example the level of energy required for the vehicle to be able to maintain the intended speed over the downgrade road section.

Based on the difference between the required energy level and the current energy level, it is possible to start to adapt the level of energy in the upstream storage means under favorable conditions in terms of the output of the thermal engine and/or to save fuel, in order for the level in the latter storage means to be the optimum when the vehicle commences its descent.

For example, there will be described with reference to FIG. 3 the situation in which the vehicle will travel a downgrade 70 of shallow slope starting from a horizontal section 71.

After evaluating the power demand to travel the downgrade section 70, given the predicted speed of the vehicle, the high energy level $N_i$ that the storage means must have to enable it by discharging its energy to a low level $N_g$ to supply the power necessary to overcome the friction of the air and to enable the vehicle to maintain its speed. The high level $N_i$ may correspond to the upper limit of energy storage and the low level $N_g$ to the low speed.

At the time $t_0$ at which the high energy level $N_i$ is determined, the current energy level in the storage means is $N_c$, with $N_c < N_i$.

It is therefore necessary to store more energy, which the vehicle begins to do from the time $t_0$ to arrive at the energy level $N_i$ at the start of the descent at the time $t_i > t_0$.

Once the descent has been traveled at the time $t_2$ the energy reserve that has reached its low level $N_g$ in the storage means can be reconstituted, the operating mode going for example from the hybrid mode between $t_0$ and $t_1$ to the electric mode between $t_1$ and $t_2$ and then again to the hybrid mode starting from $t_2$.

In the FIG. 4 example, the slope is sufficiently steep for the power demand to be negative. In this case, the energy level in the storage means can be reduced starting from $t_0$ before reaching the sloping section at $t_1$, operating in electric mode. The energy level in the storage means can at the time $t_1$ reach the bottom limit or a level such that on leaving the descent the storage means has filled up with energy and reached the upper limit.

During the descent, between $t_1$ and $t_2$ the drive system operates in recovery mode, the energy recovered being stored in the storage means.

The invention is not limited to the example that has just been described.

In particular it is possible to determine the power demand and/or the energy level to be stored before commencing a descent from other parameters such as the driving habits of the driver, which can make it possible to correct the intended speed of the vehicle to a value other than the authorized speed limit.

The expression "including a" must be understood as being synonymous with "comprising at least one".

The invention claimed is:

1. A method of managing a drive system of a hybrid vehicle including a thermal engine and an electrical machine with an energy storage means, the hybrid vehicle having information on the topology of an upcoming downgrade road section, the method comprising:
   predicting a power demand of the hybrid vehicle as a function at least of the slope of said upcoming downgrade road section; and
   predicting an operating mode of the drive system, said operating mode being at least one selected from a group consisting of:
   coasting descent,
   descent assisted by the electrical machine alone, and
   descent braked by recovery of energy,
   wherein a level of energy in the energy storage means is adapted before arrival at the upcoming downgrade road section as a function of both predictions.

2. The method according to claim 1, the energy storage means being electrochemical.

3. The method as claimed in claim 1, wherein when the predicted operating mode is descent braked by recovery of energy, the level of energy in the energy storage means is modified before arriving at the upcoming downgrade road section so that on leaving the upcoming downgrade road section, the level of energy in the energy storage means is higher than on arriving at the upcoming downgrade road section, and wherein the level of energy in the energy storage means on leaving the upcoming downgrade road section reaches an upper limit.

4. The method as claimed in claim 1, the level of energy in the energy storage means being increased before arrival at said section.

5. The method as claimed in claim 4, the level of energy in the energy storage means being increased before commencing the descent so that the energy storage means supplies all the energy necessary for maintaining an authorized limit speed for the hybrid vehicle throughout the descent, wherein the operating mode is driving by the electric motor only.

6. The method as claimed in claim 1, wherein the power demand is also predicted on the basis of a known limit speed authorized for the hybrid vehicle on said upcoming downgrade road section.

7. The method as claimed in claim 1, wherein the level of energy in the energy storage means evolves between minimum and maximum limits when the hybrid vehicle travels over said section.

8. The method as claimed in claim 1, the information concerning the topology being received by the vehicle from one selected from a group consisting of: a geolocation system and from another vehicle.

9. The method as claimed in claim 1, in which the vehicle maintains a constant speed when it travels over the upcoming road section.

10. A method of managing a drive system of a hybrid vehicle including a thermal engine and an electrical machine with an energy storage means, the hybrid vehicle having information on the topology of an upcoming downgrade road section, the method comprising:
    predicting a power demand of the hybrid vehicle as a function at least of the slope of said upcoming downgrade road section; and
    predicting an operating mode of the drive system, said operating mode being at least one selected from a group consisting of:
        coasting descent,
        descent assisted by the electrical machine alone, and
        descent braked by recovery of energy,
    wherein a level of energy in the energy storage means is adapted before arrival at the upcoming downgrade road section as a function of both predictions
    wherein a calculation means performs the above method.

* * * * *